United States Patent

Shinohara et al.

[11] Patent Number: 5,979,910
[45] Date of Patent: Nov. 9, 1999

[54] RETAINER FOR USE IN FLUID COUPLINGS

[75] Inventors: Tsutomu Shinohara; Michio Yamaji, both of Osaka, Japan

[73] Assignee: Fujikin Incorporated, Osaka, Japan

[21] Appl. No.: 08/949,430

[22] Filed: Oct. 14, 1997

[30] Foreign Application Priority Data

Oct. 15, 1996 [JP] Japan ................................. 8-272034

[51] Int. Cl.$^6$ .................................................. F16J 15/12
[52] U.S. Cl. .......................................... 277/616; 285/379
[58] Field of Search ..................................... 285/379, 305, 285/921; 277/616; 24/499

[56] References Cited

U.S. PATENT DOCUMENTS

| | | | |
|---|---|---|---|
| 1,019,572 | 3/1912 | Whipple | 285/379 X |
| 4,721,331 | 1/1988 | Lemelshtrich | 285/305 |
| 5,163,721 | 11/1992 | Babuder | 285/379 X |
| 5,179,768 | 1/1993 | Jio | 24/499 X |
| 5,340,170 | 8/1994 | Shinohara et al. | 285/379 |

FOREIGN PATENT DOCUMENTS 2 182 743  5/1987  United Kingdom .................... 285/379

*Primary Examiner*—Anthony Knight
*Attorney, Agent, or Firm*—Armstrong, Westerman, Hattori, McLeland & Naughton

[57] ABSTRACT

A retainer comprises a gasket holder for holding the outer periphery of an annular gasket, and a coupling member holder for holding an end portion of a coupling member. The coupling member holder comprises two elastically deformable lugs projecting axially of the retainer for holding the coupling member. The retainer has handle pieces elastically deformable radially inwardly of the retainer to thereby elastically deform the coupling member holding lugs radially inward.

3 Claims, 4 Drawing Sheets

RETAINER FOR USE IN FLUID COUPLINGS

BACKGROUND OF THE INVENTION

The present invention relates to a retainer for use in fluid couplings which is adapted to be attached to one of a pair of coupling members for holding an annular gasket as interposed between opposed end faces of the coupling members.

Fluid couplings are conventionally used which comprise a pair of coupling members each formed with a gasket clamping annular projection for pressing an annular gasket from opposite sides thereof to provide a fluid-tight joint. The fluid coupling has incorporated therein a retainer which comprises a gasket holder for holding the outer periphery of the annular gasket, and a coupling member holder for holding an end portion of one of the coupling members. The gasket, which is interposed between the opposed end faces of the coupling members, is held to one of the coupling members by the retainer. The coupling member holder comprises a plurality of elastically deformable holding lugs projecting in an axial direction. These lugs are forcibly fitted around the end portion of the coupling member with the outer periphery of the retainer held with fingers, whereby the coupling member end portion is held by the lugs (see JP-B No. 62756/1990 end Japanese Patent Application No.99309/1992).

The conventional retainer for use in fluid couplings has the problem that the elastically deformable holding lugs fail to effectively hold the coupling member when having too small an elastic force, or are difficult to attach to or remove from the coupling member when having an excessive elastic force.

SUMMARY OF THE INVENTION

An object of the present invention is to provide a retainer for use in fluid couplings which is adapted to satisfactorily hold the coupling member and which is nevertheless easy to attach to and remove from the coupling member.

The present invention provides a retainer for use in fluid couplings which comprises a ring serving as a skeleton, a gasket holder for holding an outer periphery of a gasket, a coupling member holder for holding an end portion of a coupling member, and a handle for making the retainer easily fingers holdable. The handle permitting fingers to easily hold the retainer and renders the retainer easy to hold.

Preferably, the coupling member holder comprises a plurality of elastically deformable lugs provided on the ring so as to project therefrom in a direction axially of the ring for holding the coupling member, and the handle comprises a plurality of handle pieces each formed on the ring at an outer periphery of the portion thereof provided with the lug and projecting in an axial direction opposite to the lug, the lugs being elastically deformable radially outwardly of the ring by elastically deforming the handle pieces radially inwardly of the ring. When the handle pieces are held with fingers and elastically deformed radially inward, the coupling member holding lugs are then elastically deformed radially outward and opened, so that the retainer is easy to attach to and remove from the coupling member. When the handle pieces are released from the fingers, the lugs return to the original state, holding the coupling member end portion with an elastic force. If the elastic force is given an appropriate value, the coupling member can be held reliably. The retainer is removable from the coupling member also easily by holding the handle pieces with fingers and elastically deforming the pieces radially inward.

Preferably, the gasket holder comprises four gasket holding claws projecting radially inward from an inner periphery of the ring and equidistantly spaced apart along the ring, each of the claws having an axially bent end to provide a bent portion having an inner face for elastically pressing the outer periphery of the gasket. The gasket can then be held reliably.

DESCRIPTION OF THE PREFERRED EMBODIMENTS

Embodiments of the present invention will be described below with reference to the drawings.

Figure 1:
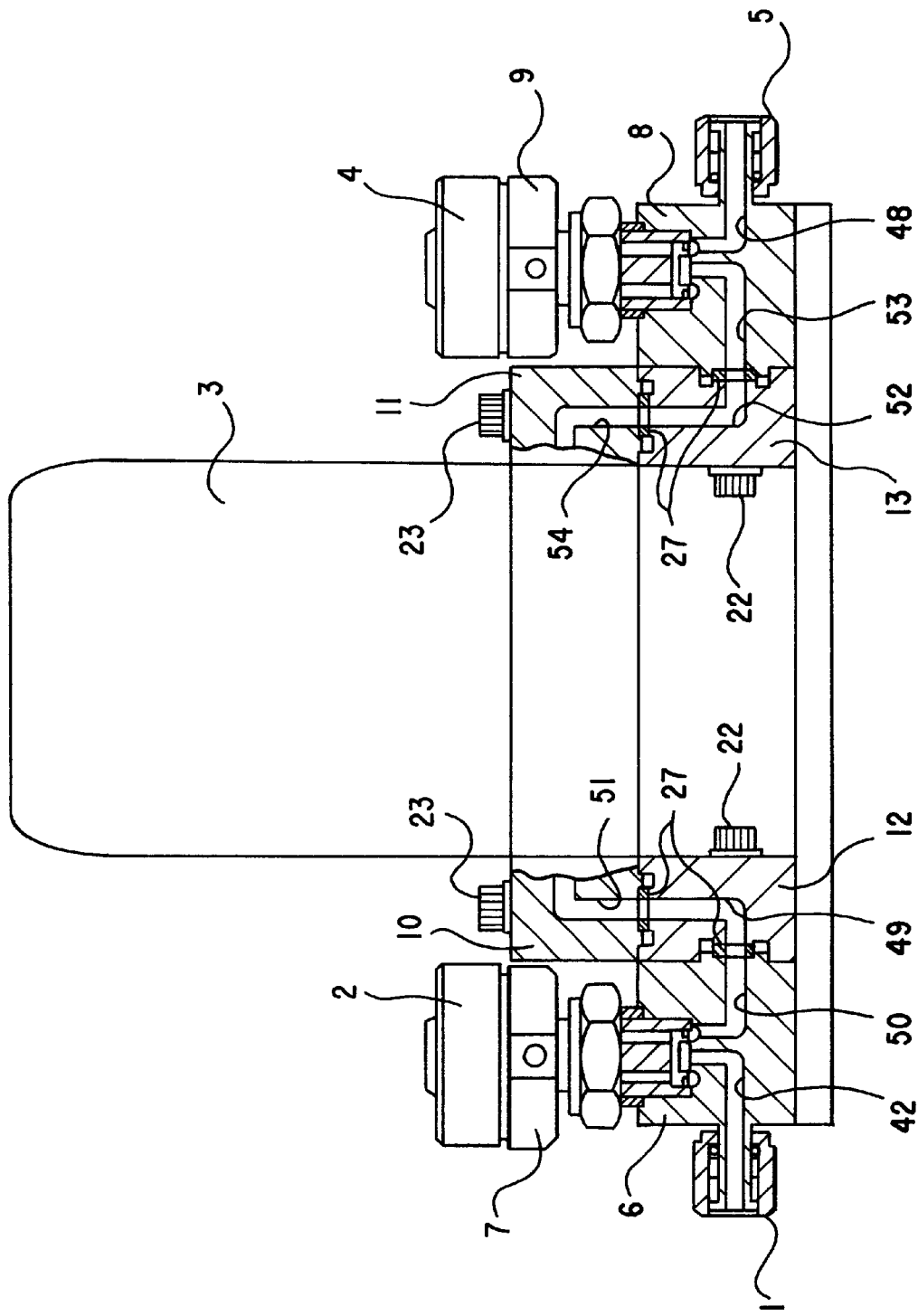
FIG. 1 is a front view partly broken away and showing an example of fluid control device having fluid couplings embodying the invention.

The terms "upper," "lower," "left" and "right" as herein used refer respectively to the upper, lower, left and right sides of FIG. 1. The terms "upper" and "lower" are used for convenience of description; the illustrated device may be installed as turned upside down or in a lateral position.

FIG. 1 shows a fluid control device wherein retainers of the invention are used for fluid couplings. The device comprises, as arranged from left rightward, a fluid inlet portion 1, first on-off valve 2, massflow controller (regulator) 3, second on-off valve 4 and fluid outlet portion 5. The first on-off valve 2 comprises a blocklike body 6 having a leftwardly opened inlet channel 42 and a rightwardly opened outlet channel 50, and an actuator 7 for blocking or permitting communication between the two channels 42, 50. Similarly, the second on-off valve 4 comprises a blocklike body 8 having a leftwardly opened inlet channel 53 and a rightwardly opened outlet channel 48, and an actuator 9 for blocking or permitting communication between the two channels 53, 48.

The regulator 3 is provided at the left and right sides of its lower end portion with left and right upper channel blocks 10, 11 as projected leftward and rightward. The left upper channel block 10 is formed with a downwardly opened inlet channel 51 in communication with an inlet channel (not shown) of the regulator 3. The right upper channel block 11 has a downwardly opened outlet channel 54 in communication with an outlet channel (not shown) of the regulator 3. Although not shown, the channel blocks 10, 11 are fixed to the regulator 3 with screws driven in sideways.

Left and right lower channel blocks 12, 13 are provided beneath the left and right upper channel blocks 10, 11, respectively. The right face of the body 6 of the first on-off valve 2 is in contact with the left face of the left lower channel block 12, and the left face of the body 8 of the second on-off valve 4 with the right face of the right lower channel block 13.

The left lower channel block 12 is formed with an inlet channel 49 for holding the rightwardly opened outlet channel 50 of the first on-off valve 2 in communication with the downwardly opened inlet channel 51 of the left upper channel block 10. The right lower channel block 13 has an outlet channel 52 for holding the downwardly opened outlet channel 54 of the right upper channel block 11 in communication with the leftwardly opened inlet channel 53 of the second on-off valve 4.

The body 6 of the first on-off valve 2 is joined to the left lower channel block 12 with screws 22 driven into the block 12 from the right side thereof. Similarly, the body 8 of the second on-off valve 4 is joined to the right lower channel block 13 with screws 22 driven into the block 13 from the left side thereof, Furthermore, the upper channel blocks 10, 11 are joined to the respective lower channel blocks 12, 13 with screws 23 driven in from above the blocks 10, 11.

A fluid coupling 27 is provided at each of a plurality of locations, i.e., between the body 6 of the first on-off valve 2 and the left lower channel block 12, between the body 8 of the second on-off valve 4 and the right lower channel block 13, between the upper channel blocks 10, 11 and the respective lower channel blocks 12, 13 and between the regulator 3 and the left and right upper blocks 10, 11.

Figure 2:
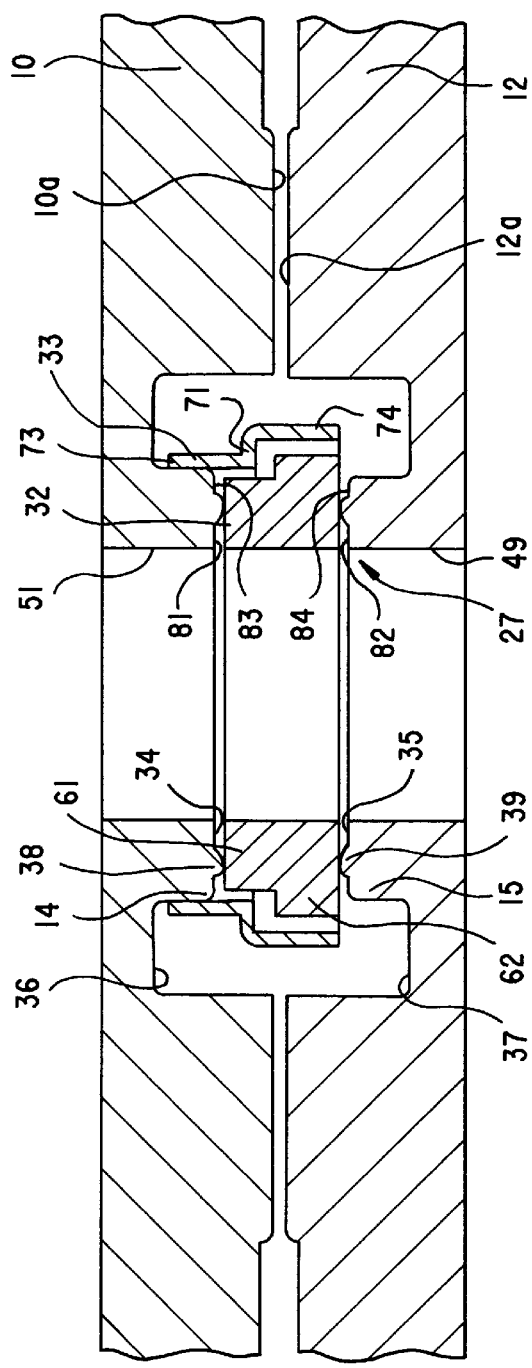
FIG. 2 is an enlarged view in section of the fluid coupling shown in FIG. 1.

With reference to FIG. 2, the fluid coupling 27 will be described which is provided between the left upper channel block (hereinafter referred to as the "first coupling member") 10 and the left lower channel block (hereinafter referred to as the "second coupling member") 12 having the inlet channels (fluid channels) 51, 49, respectively.

The fluid coupling 27, which is adapted to hold the joint of the first and second coupling members 10, 12 fluid-tight, comprises abutting end faces of these members 10, 12 which are so shaped as will be described below, an annular gasket 32 interposed between the two coupling members 10, 12, a retainer 33 holding the outer periphery of the gasket 32 for holding the gasket 32 to the first coupling member 10 according to the illustrated embodiment, and screw means 23, FIG. 1, for fastening the two coupling members 10, 12 together.

The first and second coupling members 10, 12 are formed in their abutting end faces with respective gasket accommodating portions 34, 35 which are recessed by approximately one-half of the thickness of the gasket 32 respectively from reference faces 10a, 12a each included in the corresponding end face and projecting most greatly therefrom, and with respective retainer accommodating annular recessed portions 36, 37 disposed around the recessed portions 34, 35 and having a deeper bottom face than the portions 34, 35. The gasket accommodating recessed portions 34, 35 are formed on their bottom surfaces with respective annular projections 38, 39 for clamping the gasket 32. The first and second coupling members 10, 12 are identical in shape with respect to these recessed portions 34, 35, retainer accommodating recessed portions 36, 37 and annular projections 38, 39. The bottom surface of each recessed portion 34 (35) and the inner peripheral surface of each recessed portion 36 (37) form a retainer holding hollow cylindrical portion 14 (15) which has the gasket clamping annular projection as (39) at its projecting end. The bottom surface of the gasket accommodating recessed portion 34 (35), i.e., the end surface of the cylindrical portion 14 (15), is divided into an inner flat face 81 (82) positioned radially inwardly of the annular projection 38 (39) and approximately perpendicular to the axis of the channel portion 51 shown in FIG. 2, and an outer flat face 83, (84) positioned radially outwardly of the annular projection 38 (39) and approximately perpendicular to the axial direction, The inner flat face 81 (82) is lightly (about 0.02 mm) projected beyond the outer flat ace 83 (84) axially of the channel portion 51.

The gasket 32 is made of stainless steel, has an inside diameter equal to the diameter of the channels 51, 49 of the coupling members 10, 12 and comprises a small portion 61 and a large portion 62 having a larger outside diameter than the small portion 61.

The retainer 33 is made from stainless steel as an integral piece. As shown in greater detail in FIGS. 3 to 6, the retainer 33 comprises a ring 71 serving as a skeleton, a gasket holder 72 for holding the outer periphery of the gasket 32, a coupling member holder 73 for holding an end portion of the first coupling member 10, and a handle 74 for permitting fingers to hold the retainer with ease.

The ring 71 is L-shaped in section and so adapted as not to deform diametrically when held by a force of fingers.

The gasket holder 72 comprises four gasket holding claws 72a projecting radially inward from the inner periphery of the ring 71 and equidistantly spaced apart along the ring. Each of the claws 72a is slightly resilient and has an axially bent inner ends and the inner surface of the bent portion 72b is adapted to elastically press the outer periphery of the small portion 61 of the gasket 32, whereby the gasket 32 is prevented from moving inside the retainer 33 radially and axially thereof. When the gasket 32 is fitted into the retainer 33, the large portion 62 of the gasket 32 bears against the holding claws 72a and is thereby retained in position. This eliminates the likelihood of the gasket 32 slipping off the retainer 33.

The coupling member holder 73 comprises two coupling member holding lugs 73a radially extending from the inner ends of two edge portions 71a opposed to each other and radially inwardly projecting from the inner periphery of the ring 71. Each of the holding lugs 73a is larger than the gasket holding claw 72a and positioned between the adjacent two claws 72a, with a small clearance formed between the lug and each claw. The two lugs 73a, which are slightly resilient, elastically hold therebetween the outer periphery of the retainer holding cylindrical portion 14 of the first coupling member 10, whereby the retainer 33 is held to the first coupling member 10.

The handle 74 comprises two handle pieces 74a each formed on the ring 71 at the outer periphery of the portion thereof provided with the holding lug 73a and projecting in an axial direction opposite to the lug 73a.

When the two handle pieces 74a are held with fingers and forced radially inward, the force deforms each holding lug 73a radially outward as supported at the portion of the ring 71 at the junction of the lug 73a and the handle piece 74a. Thus, the lugs 73a are opened, permitting the retainer 33 to be attached to the coupling member 10 with ease. When the handle pieces 74a are released from the fingers after the retainer 33 is attached to the coupling member 10, the lugs 73a return to the original state, elastically holding the cylindrical portion 14 of the coupling member 10. When the elastic force is given an appropriate value, the coupling member 10 can be effectively held.

Figure 7:
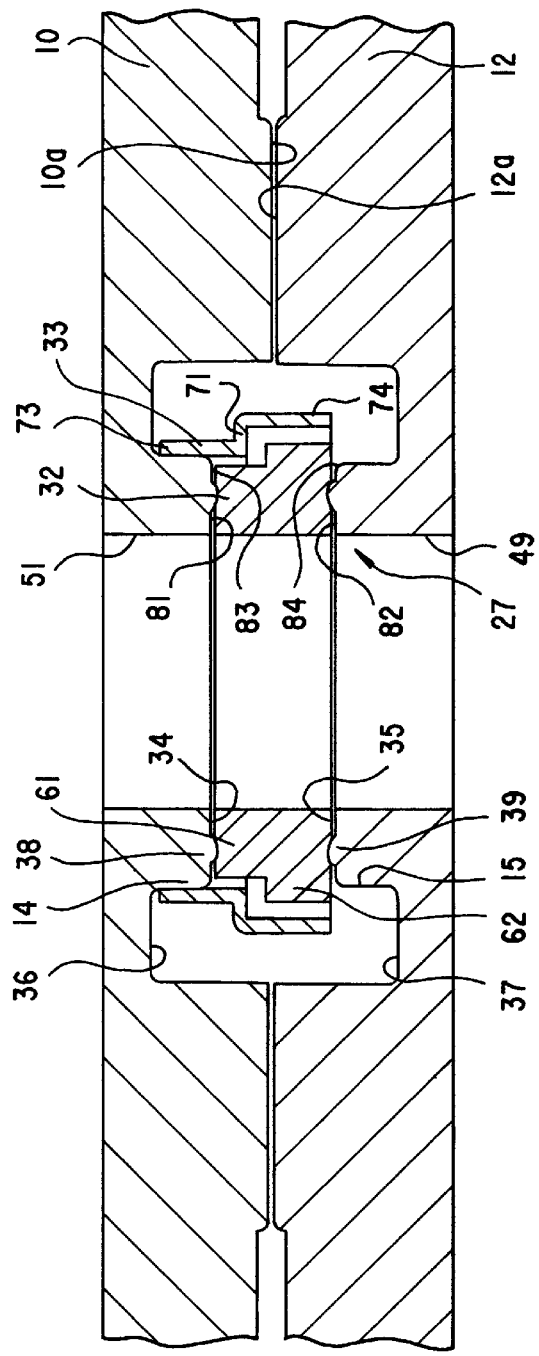
FIG. 7 is an enlarged view in section of the fluid coupling shown in FIG. 2 to illustrate a state of the coupling while it is being tightened up.
Figure 3:
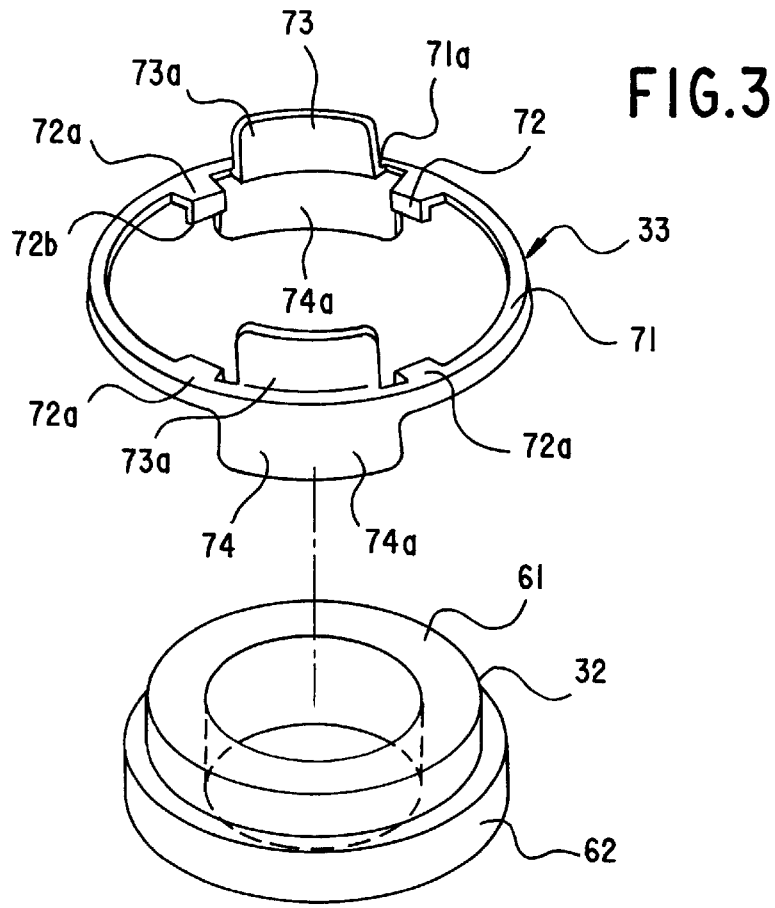
FIG. 3 is an exploded perspective view showing a retainer and a gasket.

FIG. 2 shows the first and second coupling members 10, 12 as fastened together by manually tightening up the screws 23 for these members. In this state, the gasket clamping annular projections 38, 39 only are in bearing contact with the gasket 32, with a clearance remaining between each end face of the gasket 32 and the inner flat face 81 (82), opposed thereto, of the recessed portion 34 (35) of the coupling member 10 (12), as well as between the reference faces 10a, 12a of abutting end faces of the two coupling members 10, 12. The clearance between each gasket end face and the inner flat face 81 (82) opposed thereto is 0.1 mm, and the clearance between the reference faces 10a, 12a is 0.22 mm. Accordingly, when the screws are tightened with a spanner from the state shown in FIG. 2, the inner flat faces 81, 82 first come into contact with the respective end faces of the gasket 32, whereupon the gradient of the tightening torque alters to give a perceivable reaction to the hand. FIG. 7 shows this state. In this state, a clearance still remains between the reference faces 10a, 12a of the two coupling members 10, 12 as seen in FIG. 7. The reference faces 10a, 12a come into contact with each other when the screws 23 are further tightened up. The variation in the gradient of the tightening torque occurring at this time can be made greater than the variation in the gradient of the tightening torque produced upon the inner flat faces 81, 82 of the gasket accommodating recessed portions 34, 35. coming into contact with the respective end faces of the gasket 32, by giving a greater area to the reference faces 10a, 12a than to the inner flat faces 81, 82. The reference faces 10a, 12a of abutting end faces of the coupling members 10, 12 then act as a stopper, preventing further tightening. Further the increase of the stopper area results in enhanced flexural strength. Even in this state, there remains a clearance of 0.01 mm between the outer flat face 83 (84) of the gasket accommodating recessed portion 34 (35) of the coupling member 10 (12) and each gasket end face. The proper tightening range is from the position where the inner flat faces 81, 82 come into contact with the respective faces of the gasket 32 to the position where the reference faces 10a, 12a come into contact with each other.

With the fluid coupling 27 described, the retainer 33 is capable of holding either one of the first and second coupling members 10, 12, so that in assembling the fluid control device shown in FIG. 1, the components 3, 6, 8, 10, 11, 12, 13 can be joined or connected to one another regardless of whether the abutting end face of each component is of the male type or female type. The retainer 33 is adapted to hold the retainer holding cylindrical portion 14 of the first coupling member 10 with which the small portion 61 of the gasket 32 is in contact, whereby the gasket 32 can be accurately positioned in place relative to the gasket clamping projection 38 of the first coupling member. It is likely that the coupling members 10, 12 will shift relative to each other in a direction perpendicular to the axis (misalignment of their axes) when the screws 23 are tightened, shifting the gasket clamping projection 39 of the second coupling member 12 relative to the gasket 32, whereas the large portion 62 of the gasket 32 is adapted for contact with the second coupling member 12, and the projecting 39 is less likely to become released from the gasket end face 32 which has a larger area, even in the event of such shifting, consequently preventing impairment of the seal due to shifting or displacement. The deformation of the gasket 32 occurring when the fluid coupling 27 is tightened up is absorbed by the deformation of the four gasket holding claws 72a, with the result that the coupling member holder 73 remains unaffected, effectively holding the retainer 33 to the coupling member 10 without impairment. These effects are sustained also when the fluid coupling 27 as disassembled is assembled again to assure the coupling of the sealing function. The number of claws 72a, lugs 73a or handle pieces 74a in the foregoing embodiment is not limited to the number mentioned.

Figure 8:
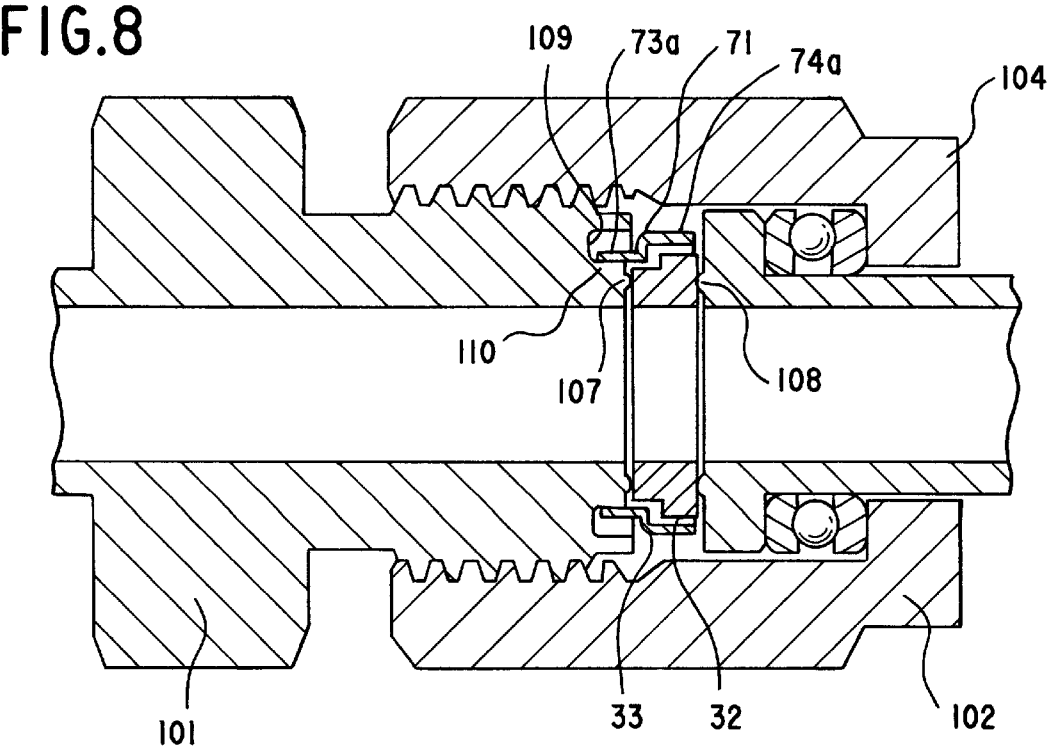
FIG. 8 is a view in longitudinal section showing an example of pipe coupling including a retainer of the invention for use in fluid couplings.
Figure 4:
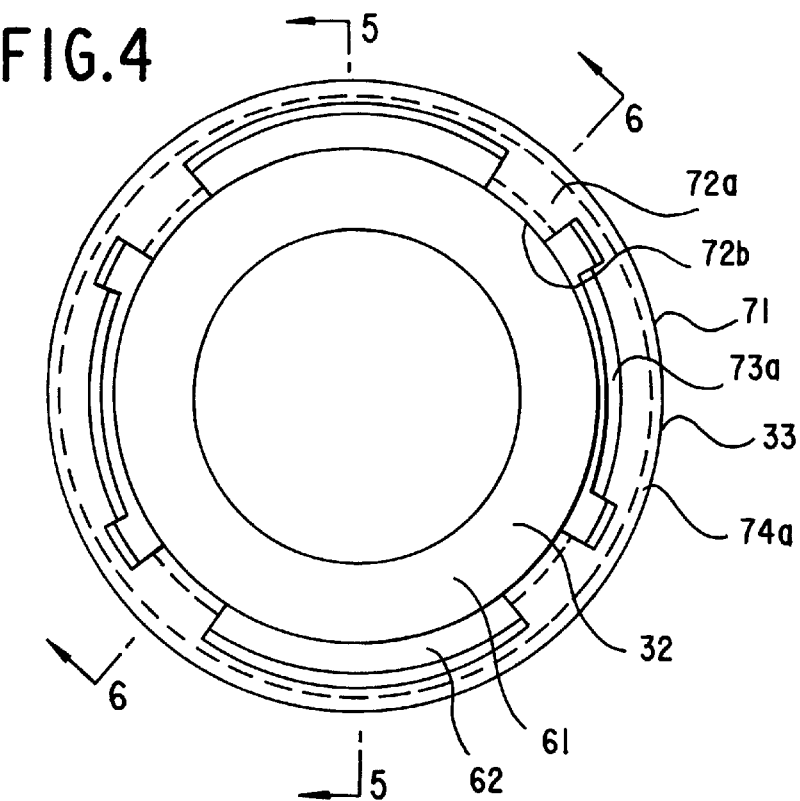
FIG. 4 is a view showing the retainer with the gasket held thereto, as the retainer is seen from one side thereof having a coupling member holder.
Figure 5:
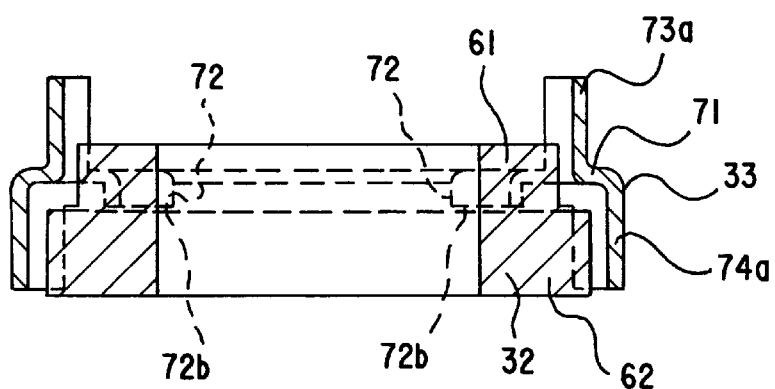
FIG. 5 is a view in section taken along the line 5—5 in FIG. 4.
Figure 6:
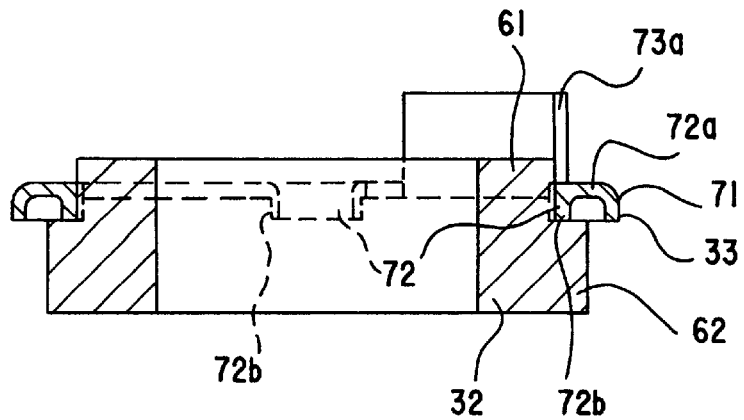
FIG. 6 is a view in section taken along the line 6—6 in FIG. 4.

The retainer 33 for use in fluid couplings is usable also for coupling members other than the members 10, 12 described. FIG. 8 shows an example of application to a pipe coupling. In the following description, the terms "left" and "right" refer respectively to the left-hand side and right-hand side of the drawing.

The pipe coupling shown in FIG. 8 comprises a first tubular coupling member 101, second tubular coupling member 102, annular gasket 32 interposed between the right end face of the first member 101 and the left end face of the second member 102, and retainer 33 held to the first member 101 for holding the gasket 32. The second coupling member 102 is fastened to the first coupling member 101 by a nut 104 provided on the second member 102 and screwed on the first member 101.

In the above assembly, the gasket 32 and retainer 33 are the sane as those already described. The coupling members 101, 102 are formed on their abutting end faces with respective gasket clamping annular projections 107, 108. The first coupling member 101 is further formed with a retainer accommodating annular recessed portion 109 positioned radially outwardly of the clamping projection 107. The inner periphery of the recessed portion 109 is defined by the outer peripheral surface of a retainer holding hollow cylindrical portion 110.

With the pipe coupling described, the gasket 32 is held by the retainer 33, which in turn is held to the first coupling member 101, and the large portion 62 of the gasket 32 is in bearing contact with the second coupling member 102, whereby the gasket 32 is reliably positioned in place, preventing the seal from being impaired by displacement. The coupling member holding lugs 73a are elastically deformable radially outward by holding the handle pieces 74a with fingers and elastically deforming the pieces radially inward, whereby the retainer 33 can be attached to the coupling member 101 and removable therefrom easily.

What is claimed is:

1. A retainer for use in fluid couplings having opposingly facing channel forming members for passage of fluid through said channel forming members comprising:

a ring forming a skeleton for said retainer, a gasket holder on said ring for holding an outer periphery of a gasket, a coupling member holder on said ring for holding an end portion of a coupling member, and a handle for making the retainer easily holdable with fingers of a holder.

2. A retainer for use in fluid couplings according to claim 1 wherein said coupling member holder comprises:

a plurality of elastically deformable lugs on said ring so as to project therefrom in a direction axially of said ring for holding said coupling member, and said handle comprising a plurality of handle pieces, each formed on the ring at an outer periphery of the portion thereof provided with said lugs and projecting in an axial direction opposite to said lugs, said lugs being elastically deformable radially outwardly of said ring by elastically deforming said handle pieces radially inwardly of said ring.

3. A retainer for use in fluid couplings according to claim 2 wherein said gasket holder comprises four gasket holding claws projecting radially inward from an inner periphery of said ring and equidistantly spaced apart along said ring, each of said claws having an axial bend forming a bent portion having an inner face for elastically pressing an outer periphery of said gasket.

* * * * *